(12) United States Patent
Kim et al.

(10) Patent No.: US 12,015,703 B2
(45) Date of Patent: Jun. 18, 2024

(54) ELECTRONIC DEVICE FOR USER AUTHENTICATION, SERVER, AND CONTROL METHOD THEREFOR

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Jinsu Kim, Suwon-si (KR); Jung Hee Cheon, Seoul (KR); Junbum Shin, Suwon-si (KR); Jinhyuck Jeong, Seoul (KR); Heewon Chung, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 990 days.

(21) Appl. No.: 16/959,587

(22) PCT Filed: Jan. 11, 2019

(86) PCT No.: PCT/KR2019/000490
§ 371 (c)(1),
(2) Date: Jul. 1, 2020

(87) PCT Pub. No.: WO2019/139420
PCT Pub. Date: Jul. 18, 2019

(65) Prior Publication Data
US 2020/0389303 A1    Dec. 10, 2020

(30) Foreign Application Priority Data

Jan. 11, 2018    (KR) .......................... 10-2018-0003826

(51) Int. Cl.
*H04L 9/08* (2006.01)
*H04L 9/40* (2022.01)

(52) U.S. Cl.
CPC ........ *H04L 9/0866* (2013.01); *H04L 63/0861* (2013.01)

(58) Field of Classification Search
USPC ........................................................ 713/153
See application file for complete search history.

(56) References Cited

U.S. PATENT DOCUMENTS

| 8,572,385 B2 | 10/2013 | Papamanthou et al. |
| 2009/0283809 A1 | 11/2009 | Sin et al. |

(Continued)

FOREIGN PATENT DOCUMENTS

| CN | 106060073 A | * 10/2016 | ........... H04L 63/061 |
| CN | 106921491 | 7/2017 | |

(Continued)

OTHER PUBLICATIONS

Search Report and Written Opinion dated May 2, 2022 in counterpart International Patent Application No. PCT/KR2022/000829 and English-language translation.

(Continued)

*Primary Examiner* — Sanchit K Sarker
(74) *Attorney, Agent, or Firm* — Nixon & Vanderhye, P.C.

(57) ABSTRACT

An electronic device is disclosed. The device may comprise: a storage unit in which tag information is stored; a communication unit; and a processor which: acquires a biometric code string from biometric data sensed by a sensor; transmits a first cryptogram obtained by encrypting the biometric code string and the tag information, a first masking code, and a first masking encryption code obtained by encrypting the first masking code to the server through the communication unit; when tag information contained in a second cryptogram received from the server is identified as a value acquired on the basis of the stored tag information, decrypts (Continued)

the second cryptogram so as to acquire a value obtained by adding a distance value and a second masking code derived from the second cryptogram; and transmits the acquired value to the server through the communication unit, wherein the distance value includes a distance value between the biometric code string and a biometric code string already stored in the server, and the second masking code includes a code acquired by the server on the basis of the first masking code.

8 Claims, 6 Drawing Sheets

(56) References Cited

U.S. PATENT DOCUMENTS

| | | | | |
|---|---|---|---|---|
| 2015/0269394 | A1* | 9/2015 | Bringer | H04L 63/0861 726/26 |
| 2015/0295925 | A1* | 10/2015 | Patey | H04L 63/0861 713/186 |
| 2016/0036584 | A1* | 2/2016 | Nikolaenko | H04L 9/0816 380/28 |
| 2016/0094348 | A1 | 3/2016 | Takahashi | |
| 2016/0133164 | A1 | 5/2016 | Yoshida et al. | |
| 2016/0164670 | A1 | 6/2016 | Gentry et al. | |
| 2016/0178805 | A1 | 6/2016 | Kang et al. | |
| 2017/0104752 | A1 | 4/2017 | Sakemi et al. | |
| 2017/0149796 | A1 | 5/2017 | Gvili | |
| 2017/0293913 | A1* | 10/2017 | Gulak | G06Q 20/3829 |
| 2020/0264343 | A1 | 8/2020 | Han et al. | |
| 2021/0014394 | A1 | 1/2021 | Han et al. | |

FOREIGN PATENT DOCUMENTS

| | | |
|---|---|---|
| JP | 2008-167107 | 7/2008 |
| KR | 10-2008-0075956 | 8/2008 |
| KR | 10-2009-0119659 | 11/2009 |
| KR | 10-2016-0133991 | 11/2016 |
| KR | 10-1677114 | 11/2016 |
| KR | 10-2018-0037909 | 4/2018 |
| KR | 10-2018-0132014 | 12/2018 |
| KR | 10-2020-0099832 | 8/2020 |

OTHER PUBLICATIONS

International Search Report for PCT/KR2019/000490 dated Apr. 5, 2019, 7 pages with English Translation.
Written Opinion of the ISA for PCT/KR2019/000490 dated Apr. 5, 2019, 7 pages with English Translation.
Notice of Allowance dated May 19, 2022 in counterpart Korean Application No. 10-2018-0003826 and English-language translation.

* cited by examiner

FIG. 3

ELECTRONIC DEVICE FOR USER AUTHENTICATION, SERVER, AND CONTROL METHOD THEREFOR

This application is the U.S. national phase of International Application No. PCT/KR2019/000490 filed Jan. 11, 2019 which designated the U.S. and claims priority to KR Patent Application No. 10-2018-0003826 filed Jan. 11, 2018, the entire contents of each of which are hereby incorporated by reference.

BACKGROUND

Field

The disclosure relates to an electronic device for executing user authentication, a server, and a control method therefor.

Description of Related Art

With the development of electronic technologies, cloud computing environment in which data is stored in a server and a user uses the data of the server by using a terminal device have been generalized. Accordingly, data requesting security such as personal information or biometric information is transmitted or received to execute user authentication between the terminal device and the server.

In particular, accidents of personal information leakage of customers stored in a server frequently occur in communication environments with low security. In addition, the personal information may be leaked due to hacking or malicious code to user terminal devices.

Therefore, there are needs to minimize a process of decrypting a cryptogram for user authentication and execute calculation in a state of the cryptogram.

SUMMARY

The disclosure is made in view of such needs described above and an object of the disclosure is to provide an encryption method for preventing leakage of personal information due to malicious behaviors of malicious users or servers.

According to an embodiment of the disclosure, there is provided an electronic device including a storage storing tag information, a communicator including circuitry, a sensor, and a processor which is configured to obtain a biometric code string from biometric data sensed by the sensor, transmit a first cryptogram obtained by encrypting the biometric code string and the tag information, a first masking code, and a first masking encryption code obtained by encrypting the first masking code to the server via the communicator, based on tag information included in a second cryptogram received from the server being identified as a value obtained based on the stored tag information, decrypt the second cryptogram, obtain a value obtained by adding a distance value to a second masking code derived from the second cryptogram, and transmit the obtained value to the server via the communicator, in which the distance value is a distance value between the biometric code string and a biometric code string stored in the server in advance, and the second masking code is a code obtained by the server based on the first masking code.

The tag information may include first tag information and second tag information, and the processor may be configured to, based on the tag information included in the second cryptogram matching with a distance between the first tag information and the second tag information, decrypt the second cryptogram and obtain a value obtained by adding the distance value to the second masking code derived from the second cryptogram.

The processor may be configured to, based on a mode for registering biometric data of a user being executed, obtain a biometric code string from biometric data sensed by the sensor, and transmit a third cryptogram obtained by encrypting the obtained biometric code string and the first tag information to the server via the communicator.

The storage may store a private key, the first cryptogram may be encrypted by the private key, and the second cryptogram may be obtained by executing distance calculation with respect to the first cryptogram in an encrypted state.

The biometric data may include at least one of fingerprint data, voice data, face data, iris data, data of lines on palm, and vein distribution data.

According to another embodiment of the disclosure, there is provided a server including a storage storing authentication information obtained by encrypting a first biometric code string obtained from biometric data of a user and first tag information, a communicator including circuitry, and a processor configured to receive a first cryptogram obtained by encrypting a second biometric code string and second tag information, a first masking code, and a first masking encryption code for user authentication from an electronic device via the communicator, transmit a second cryptogram including a value obtained by adding a distance between the first cryptogram and the authentication information to a second masking encryption code to the electronic device, based on a value obtained by adding a distance between the first and second biometric code strings to a second masking code being received, obtain the distance between the first and second biometric code strings based on the second masking code obtained from the first masking code, and execute user authentication based on the obtained distance, in which the second masking encryption code is obtained based on the first masking encryption code.

The processor may be configured to, based on the obtained distance being lower than a predetermined threshold value, executing the user authentication.

The second masking code may be a value obtained by multiplying an arbitrary integer string α by the first masking code, and the second masking encryption code may be a value obtained by multiplying the arbitrary integer string α by the first masking encryption code.

According to still another embodiment of the disclosure, there is provided a method for controlling an electronic device, the method including obtaining a biometric code string from biometric data and transmitting a first cryptogram obtained by encrypting the biometric code string and tag information, a first masking code, and a first masking encryption code obtained by encrypting the first masking code to a server, and based on tag information included in a second cryptogram received from the server being identified as a value obtained based on tag information stored in advance, decrypting the second cryptogram, obtaining a value obtained by adding a distance value to a second masking code derived from the second cryptogram, and transmitting the obtained value to the server, in which the distance value is a distance value between the biometric code string and a biometric code string stored in the server in advance, and the second masking code is a code obtained by the server based on the first masking code.

The tag information may include first tag information and second tag information, and the transmitting the obtained value to the server may include, based on the tag information included in the second cryptogram matching with a distance between the first tag information and the second tag information, decrypting the second cryptogram and obtaining and transmitting a value obtained by adding the distance value to the second masking code derived from the second cryptogram to the server.

The method may further include, based on a mode for registering biometric data of a user being executed, obtaining a biometric code string from sensed biometric data, and transmitting a third cryptogram obtained by encrypting the obtained biometric code string and the first tag information to the server.

The first cryptogram may be encrypted by the private key, and the second cryptogram may be obtained by executing distance calculation with respect to the first cryptogram in an encrypted state.

The biometric data may include at least one of fingerprint data, voice data, face data, iris data, data of lines on palm, and vein distribution data.

According to still another embodiment of the disclosure, there is provided a method for controlling a server, the method including storing authentication information obtained by encrypting a first biometric code string obtained from biometric data of a user and first tag information, receiving a first cryptogram obtained by encrypting a second biometric code string and second tag information, a first masking code, and a first masking encryption code for user authentication from an electronic device, transmitting a second cryptogram including a value obtained by adding a distance between the first cryptogram and the authentication information to a second masking encryption code to the electronic device, and based on a value obtained by adding a distance between the first and second biometric code strings to a second masking code being received, obtaining the distance between the first and second biometric code strings based on the second masking code obtained from the first masking code, and executing user authentication based on the obtained distance, in which the second masking encryption code is obtained based on the first masking encryption code.

The executing user authentication may include, based on the obtained distance being lower than a predetermined threshold value, executing the user authentication.

The second masking code may be a value obtained by multiplying an arbitrary integer string α by the first masking code, and the second masking encryption code may be a value obtained by multiplying the arbitrary integer string α by the first masking encryption code.

Effect of Invention

According to embodiments of the disclosure described above, it is possible to prevent malicious behaviors of third parties, malicious users, and servers by inserting tags which are able to be decrypted by only each of a user terminal and a server to a cryptogram.

DETAILED DESCRIPTION

The disclosure will be described in detail after briefly explaining the terms used in the specification.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there is also a term arbitrarily selected by the applicant, in which case the meaning will be described in detail in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art is omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not shown).

Hereinafter, with reference to the accompanying drawings, embodiments of the disclosure will be described in detail so that those skilled in the art can easily make and use the embodiments in the technical field of the disclosure. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

Figure 1:
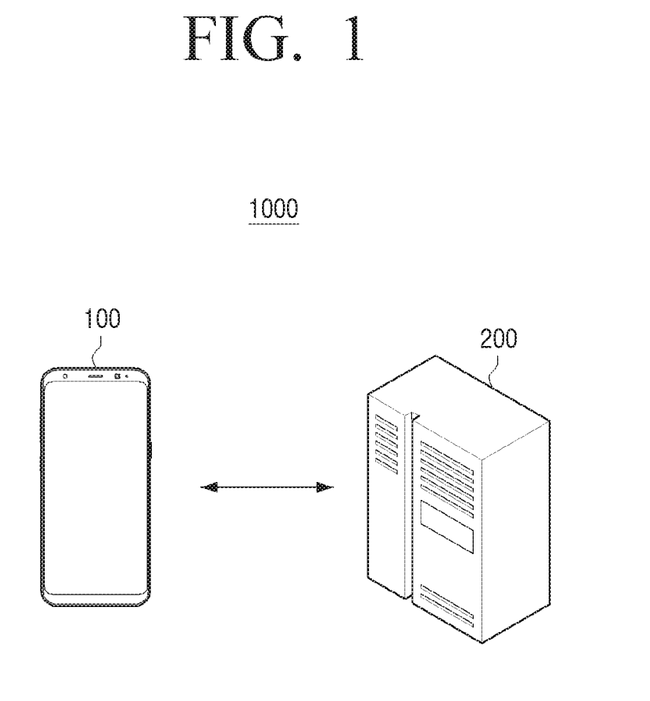
FIG. 1 is a view illustrating an electronic system according to an embodiment.

FIG. 1 is a view illustrating an electronic system according to an embodiment of the disclosure.

An electronic system 1000 may include an electronic device 100 and a server 200.

The electronic device 100 may include various electronic devices capable of performing biometric authentication such as a smartphone, a smart TV, a PDA, a cellular phone, a desktop, a notebook, or the like. In this case, the biometric authentication means various authentication methods for accessing encrypted data by using various types of biometric information such as fingerprint recognition, iris recognition, or face recognition.

The server 200 may be implemented as a plurality of server computers. The server 200 may store encrypted data. In addition, a user may access the encrypted data of the server 200 according to the biometric authentication of the electronic device 100.

In the electronic system 1000 according to an embodiment of the disclosure, when biometric data of a user is sensed by the electronic device 100, the electronic device 100 may obtain a biometric code string based on the biometric data. The electronic device 100 may transmit a first cryptogram including the biometric code string to the server 200.

Then, the server 200 may calculate the received first cryptogram and authentication information stored in the server 200 and transmit a second cryptogram which is a result of the calculation to the electronic device 100. The second cryptogram includes a distance between the biometric code string sensed by the electronic device 100 and a biometric code string included in the authentication information. In this case, the distance means a deviation value of a plurality of pieces of data and a large distance value means a large deviation value between pieces of data and a low matching degree.

The electronic device 100 may confirm whether or not the second cryptogram is derived as a result of execution of authentication by the electronic device 100 itself not by third parties, by using tag information included in the received second cryptogram. When it is confirmed that the second cryptogram is derived by the electronic device 100, the electronic device 100 transmits a value including the distance value to the server 200 again and the server 200 executes user authentication based on the distance value.

Meanwhile, the following encryption method may include homomorphic encryption method. In the homomorphic encryption, a cryptogram is calculated in the encrypted state. Accordingly, it is possible to prevent biometric information leakage from a malicious user, a malicious server computer, and a malicious third party. In addition, the electronic device 100 and the server 200 may increase security by inserting unique integer code string only known by themselves. Specific operations of the electronic device 100 and the server 200 will be described later.

Figure 2:
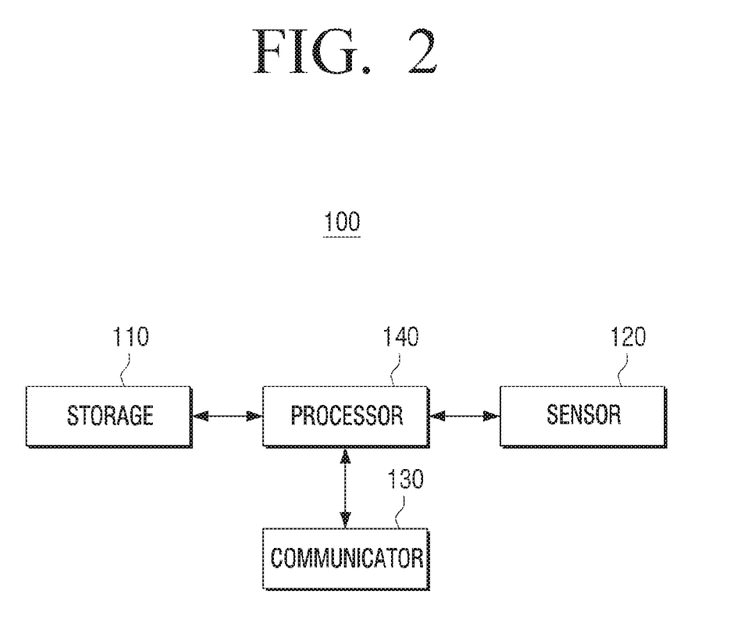
FIG. 2 is a block diagram for explaining a specific configuration of an electronic device according to an embodiment.

FIG. 2 is a block diagram for explaining a specific configuration of an electronic device according to an embodiment of the disclosure.

The electronic device 100 according to an embodiment of the disclosure may include a storage 110, a sensor 120, a communicator 130, and a processor 140.

The storage 110 stores various pieces of data necessary for operations of the electronic device 100.

In an example, the storage 110 may store tag information for confirming whether or not the specific electronic device 100 executes authentication.

Specifically, the tag information may include first tag information and second tag information. The first tag information corresponds to tag information to be transmitted to the server 200 at a user registration stage, and the second tag information corresponds to tag information to be transmitted to the server at a user authentication stage. The specific matters will be described later.

In another example, the storage 110 may store a private key.

Specifically, the private key may include two integers which are pairwise coprime and used for Chinese Remainder Theorem (CRT) homomorphic encryption method which will be described later. In addition, the private key is a value which may be decrypted only by the electronic device 100 and corresponds to a value which would not be known by the server 200 or third parties. Specific description thereof will be described later.

In particular, the storage 110 may store data necessary for executing various processes by the processor 140. In an example, the storage 110 may be implemented as an internal memory such as a ROM, a RAM, or the like included in the processor 140 or may be implemented as a memory separated from the processor 140. In this case, the storage 110 may be implemented in a form of a memory embedded in the electronic device 100 or implemented in a form of a memory detachable from the electronic device 100 according to data storage purpose. For example, data for operating the electronic device 100 may be stored in a memory embedded in the electronic device 100, and data for an extended function of the electronic device 100 may be stored in a memory detachable from the electronic device 100. The memory embedded in the electronic device 100 may be implemented as a non-volatile memory, a volatile memory, a flash memory, a hard disk drive (HDD), or a solid state drive (SSD), and the memory detachable from the electronic device 100 may be implemented as a memory card (e.g., micro SD card or USB memory), external memory connectable to the USB port (e.g., USB memory).

The sensor 120 may include a plurality of sensors for recognizing biometric data of a user.

Specifically, the sensor 120 may include at least one of a fingerprint recognition sensor, a voice recognition sensor, a face recognition sensor, an iris sensor, a sensor for lines on palm, and a vein distribution sensor for sensing biometric data of a specific user. However, there is no limitation thereto, and the sensor 120 may include various sensors capable of recognizing a specific user using user biometric data.

The communicator 130 executes communication with the server 200.

The communicator 130 may transmit a cryptogram obtained by the electronic device 100 and receive a cryptogram obtained by the server 200. In addition, the communicator 130 may transmit or receive various pieces of data including a cryptogram for executing user authentication.

For example, the communicator 130 may execute communication through various communication systems such as IR (Infrared), Wireless Fidelity (WI-FI), Bluetooth, Zigbee, Beacon, near field communication (NFC), WAN, LAN, Ethernet, IEEE 1394, HDMI, USB, MHL, AES/EBU, Optical, Coaxial, and the like.

The processor 140 controls general operations of the electronic device 100.

According to an embodiment of the disclosure, the processor 140 may be implemented as a digital signal processor (DSP), a microprocessor, or a time controller (TCON) processing digital signals. However, there is no limitation thereto, and the processor 140 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 140 may be implemented as System on Chip (SoC) or large scale integration (LSI) including the processing algorithm or may be implemented in form of a Field Programmable gate array (FPGA).

The processor 140 may obtain a biometric code string from biometric data sensed by the sensor 120, and transmit a first cryptogram obtained by encrypting the biometric code string and tag information, a first masking code, and a first masking encryption code obtained by encrypting the first masking code to the server 200 via the communicator 130.

Specifically, the processor 140 may obtain the biometric code string with n bits from the biometric data. That is, the processor 140 may obtain a biometric code string x with n-bit string from the biometric data of a person. In an example, the biometric code string may be obtained in a form of $x=(\bar{x}_0, \ldots, \bar{x}_{n-1})$. In another example, if the biometric data is a fingerprint, the processor 140 may obtain a biometric code string with 1024 bits, and if the biometric data is the iris, the processor 140 may obtain a biometric code string with 2048 bits. However, the particular numbers of bits herein are for convenience of description and there is no limitation to the above values.

In this case, the processor 140 may obtain a biometric code string with n-bit string from biometric data including at least one of fingerprint data, voice data, face data, iris data, data of lines on palm, and vein distribution data.

For example, the biometric code string may be obtained only by using the iris data, but the biometric code string may also be obtained by using iris and fingerprint data in order to enhance security.

Then, the processor 140 may obtain a first cryptogram based on the obtained biometric code string and tag information.

In this case, the tag information corresponds to information for confirming that the electronic device 100, no other devices, has executed predetermined calculation. That is, by inserting the tag information to the cryptogram, it is possible to prevent other devices from executing authentication with the server 200.

Specifically, the processor 140 may obtain the tag information formed of an arbitrary integer string. That is, the processor 140 may obtain the tag information formed of random integers.

In this case, the processor 140 may obtain the tag information configured with bit number which is the same as the bit number n of the biometric code string.

In an example, the processor 140 may obtain n (or N) arbitrary integers $r_i$ and $s_i$, as the bit number of the biometric code string, and the tag information $tag_i$, and obtain a cryptogram $\bar{x}=Enc(x, tag)$ using Chinese Remainder Theorem (CRT).

[Mathematical Expression 1]]

$$\bar{x}=Enc(x, tag):=\{\bar{x}_i=CRT_{(P1,P2)}(r_iQ_1+\tilde{x}_i, s_iQ_2+tag_i)\}_{i=0}^{N-1}$$

In this case, the cryptogram $\bar{x}$ may include the remainder obtained by integers p1 and p2 which are pairwise coprime. That is, the processor 140 may obtain a cryptogram including the remainder $r_iQ_1+\tilde{x}_i$ obtained by dividing an i-th cryptogram $\bar{x}_i$ by p1, and the remainder $s_iQ_2+tag_i$ obtained by dividing the i-th cryptogram $\bar{x}_i$ by p2.

Hereinafter, i means i-th bit number and the subscript i may be omitted for convenience of description.

The processor 140 may identify p1 and p2 as private keys and store these in the storage 110 for decrypting the cryptogram later. p1 and p2 included in Mathematical Expression 1 mean unique private keys which would not be known by the server 200 and third parties and are only known by the electronic device 100. In this case, p1 and p2 may be integers which are pairwise coprime according to CRT.

In addition, $r_i$ and $s_i$ obtained by the processor 140 mean small errors for enhancing security and $Q_1$ and $Q_2$ mean a message space.

After storing the obtained tag information $tag_i$, the processor 140 transmits the first cryptogram $\bar{x}$ to the server 200 via the communicator 130.

The processor 140 may obtain a first masking code and a first masking encryption code obtained by encrypting the first masking code and transmit these together with the first cryptogram.

The first masking code formed of a plain text is a value to be used in the server 200 later and the first masking encryption code is a value for enhancing security of the cryptogram.

In this case, the processor 140 may encrypt the first masking code with the first masking encryption code by the CRT homomorphic encryption such as the Mathematical Expression 1.

In addition, the processor 140 may obtain the first masking code and the first masking encryption code to have a bit number larger than the bit number of the biometric code string. This is because these are codes for masking the first cryptogram.

By doing so, the processor 140 may transmit the first cryptogram, the first masking code, and the first masking encryption code to the server 200.

When a second cryptogram is received from the server 200 and tag information included in the second cryptogram is identified as a value obtained based on tag information stored in the storage 130, the processor 140 may decrypt the second cryptogram and obtain a value obtained by adding a distance value to a second masking code derived from the second cryptogram. Then, the processor 140 may transmit the obtained value to the server 200.

Specifically, when the tag information included in the second cryptogram matches with distance between first tag information and second tag information, the processor 140 may decrypt the second cryptogram and obtain a value obtained by adding the distance value to the second masking code derived from the second cryptogram.

The distance herein may be obtained by calculation method of Euclidian distance or Hamming distance, but there is no limitation thereto.

In this case, the first tag information corresponds to tag information transmitted to the server 200 at a stage of registering the biometric data to the server 200. The second tag information corresponds to tag information transmitted to the server 200 at a stage of executing user authentication.

The processor 140 may store the first tag information and the second tag information in the storage 110 before transmitting the first tag information and the second tag information to the server 200. This is for identifying whether or not the tag information included in the second cryptogram matches the distance between the stored first tag information and the stored second tag information.

The second cryptogram includes a cryptogram obtained by executing calculation of the cryptogram received by the server 200 from the electronic device 100 in the encrypted state. The specific matters will be described later with the server 200.

When a mode for registering the biometric data of a user is executed, the processor 140 may obtain the biometric code string from biometric data sensed by the sensor 120 and transmit a third cryptogram obtained by encrypting the obtained biometric code string and the first tag information to the server 200 via the communicator 130. In this case, the server 200 may identify the third cryptogram as authentication information and store this in a storage 210 of the server.

The distance value may be a distance value between the biometric code string obtained by the processor 140 and the biometric code string stored in the server 200 in advance. The distance value may be obtained as a value of Euclidian distance or Hamming distance, but there is no limitation thereto.

That is, the distance value corresponds to a deviation value between the biometric code string obtained by the processor 140 and the biometric code string stored in the server 200 in advance and, and if the distance value is low, the server 200 may identify that the authentication is successful.

The second masking code is a value obtained by the server 200 based on the first masking code obtained by the processor 140. Specifically, the server 200 may identify and obtain a value obtained by multiplying the arbitrary integer $a_j$ by the first masking code as the second masking code. Specific matters regarding this will be described later.

The second cryptogram received by the processor 140 from the server 200 is as Mathematical Expression 2.

$$\overline{(d, \text{tag}')} + \Sigma_{j=0}^{N-1} a_j \overline{(R_j, 0)}$$ [Mathematical Expression 2]

The processor 140 may decrypt the second cryptogram and obtain a plain text such as Mathematical Expression 3.

$$(d + R'\text{tag}') \ s.t. R' = \Sigma_{j=0}^{N-1} a_j R_j$$ [Mathematical Expression 3]

In Mathematical Expression 3, $R_j$ represents the first masking code with a bit number of j, $a_j$ has an arbitrary integer string with a bit number of j, and R' represents the second masking code. In addition, d represents the distance value between the biometric code string obtained by the processor 140 and the biometric code string stored in the server 200 in advance.

When the plain text such as Mathematical Expression 3 is obtained, the processor 140 may obtain a value obtained by adding the distance value d to the second masking code R' and transmit this value to the server 200 via the communicator 130. The server 200 may execute user authentication by receiving the plain text such as Mathematical Expression 3.

Figure 3:
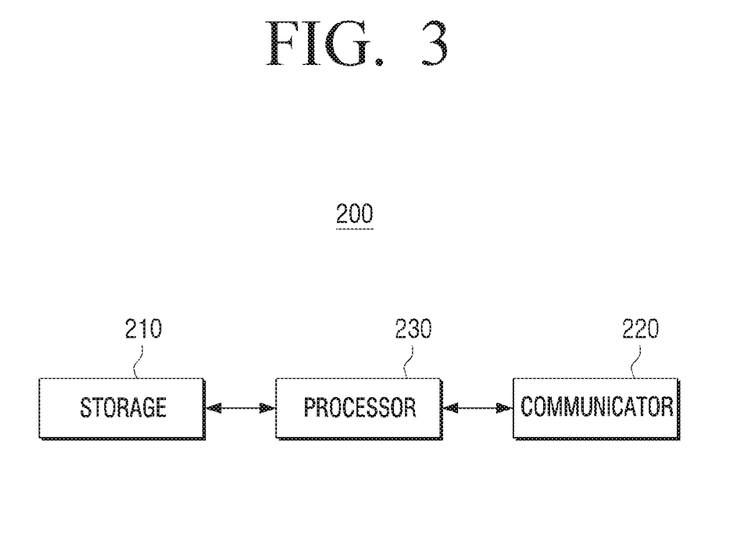
FIG. 3 is a block diagram for explaining a specific configuration of a server according to an embodiment.

FIG. 3 is a block diagram for explaining a specific configuration of the server according to an embodiment of the disclosure.

The server 200 according to an embodiment of the disclosure may include a storage 210, a communicator 220, and a processor 230.

The storage 210 stores various pieces of data necessary for the operations of the server 200.

In an example, the storage 210 may store authentication information obtained by encrypting the first biometric code string obtained from biometric data of a user and the first tag information. In this case, the authentication information may be information received from the electronic device 100.

In another example, the storage 210 may store the second masking code obtained based on the first masking code. The second masking code may be used for obtaining the distance value at a user authentication final stage.

The storage 210 may be implemented in various forms similar to the storage 110 of the electronic device 100 described above and thus the overlapped description thereof will be omitted.

The communicator 220 executes communication with the electronic device 100.

Specifically, the communicator 220 may receive a cryptogram from the electronic device 100, execute calculation for user authentication, and transmit the calculated cryptogram to the electronic device 100. In addition, the communicator 220 may transmit or receive various pieces of data including the cryptogram to execute the user authentication.

The communicator 220 may be implemented in various forms similar to the communicator 130 of the electronic device 100 and thus the overlapped description thereof will be omitted.

The processor 230 controls general operations of the server 200. In addition, the processor 230 may be implemented in various forms similar to the processor 140 of the electronic device 100.

The processor 230 may receive a first cryptogram obtained by encrypting a second biometric code string and second tag information, the first masking code, and the first masking encryption code for user authentication from the electronic device 100 via the communicator 220.

In this case, the processor 230 may obtain a distance between the first cryptogram and the authentication information.

Specifically, the processor 230 calculates a distance between the first cryptogram $\overline{x}_i$ including the second biometric code string $r_i Q_1 + \tilde{x}_i$ and the second tag information $s_i Q_2 + \text{tag}_i$, and authentication information $\overline{x}^* = (\overline{x}^*_0, \overline{x}^*_1, \ldots, \overline{x}^*_{n-1})$ including the first biometric code string $\tilde{x}^*$ and the first tag information tag*.

As described in FIG. 2, each of the biometric code string and the tag information may be formed of n-bit string and the distance may be expressed as Mathematical Expression 4.

[Mathematical Expression 4]

$$\overline{(d, tag')} = \sum_{i=0}^{n} (\overline{x}^*_i - \overline{x}_i)^2$$

That is, the processor 230 may obtain distance $$\overline{(d, tag')} = \sum_{i=0}^{n} (\overline{x}^*_i - \overline{x}_i)^2$$

between the first cryptogram and the authentication information. In this case, the distance between the first cryptogram and the authentication information may include a distance value d between the first biometric code string and the second biometric code string and a distance tag' between the first tag information and the second tag information. A bar above (d, tag') means the encrypted state.

The processor 230 may transmit the second cryptogram including a value obtained by adding the distance between the first cryptogram and the authentication information to the second masking encryption code to the electronic device 100.

In this case, the second masking encryption code is a value obtained based on the first masking encryption code received from the electronic device 100.

Specifically, the processor 230 may obtain the second masking encryption code by multiplying an arbitrary integer string α by the received first masking encryption code. In addition, the processor 230 may obtain the second masking code by multiplying the arbitrary integer string α by the received first masking code.

Then, the processor 230 may obtain the second cryptogram by adding the obtained second masking encryption code to the distance between the first cryptogram and the authentication information, and transmit the second cryptogram to the electronic device 100.

The second masking encryption code is for preventing a malicious user from executing the user authentication by making a request to the server 200 with a distance value between the biometric code strings arbitrarily decreased by the electronic device 100. That is, the second masking encryption code which is known only by the server 200 is added to the distance value to prevent the electronic device 100 from arbitrarily adjusting the distance value.

Then, when the electronic device 100 identifies the tag information included in the second cryptogram received from the server 200 as a value obtained based on the tag information stored in the storage 110, the electronic device 100 may transmit a value obtained by adding the distance between the first and second biometric code strings to the second masking code to the server 200. That is, the electronic device 100 transmits a value obtained by removing the tag information from the received value to the server 200. Accordingly, the processor 230 may receive a value obtained by adding the distance between the first and second biometric code strings to the second masking code.

Then, the processor 230 may obtain the distance between the first and second biometric code strings based on the second masking code obtained from the first masking code.

Specifically, the processor 230 may obtain the distance between the first and second biometric code strings by subtracting the second masking code from the value obtained by adding the distance between the first and second biometric code strings to the second masking code received by the processor 230. As described above, the second masking code herein corresponds to a value obtained by multiplying the arbitrary integer string α by the first masking code by the processor 230.

Then, the processor 230 may execute the user authentication based on the obtained distance.

Specifically, if the obtained distance is lower than a predetermined threshold value, the processor 230 may execute the user authentication. As described above, the distance is a distance between the first biometric code string and the second biometric code string. Accordingly, as the distance is low, an accuracy between the biometric code strings is high. Therefore, it is possible to perform the user authentication, if the distance is lower than the threshold value.

As described above in FIGS. 2 and 3, it is possible to prevent a malicious server from obtaining the biometric data by performing calculation using the tag information. In addition, it is possible to prevent a malicious user from executing the user authentication by arbitrarily decreasing the distance value by executing the calculation using the masking code.

Figure 4:
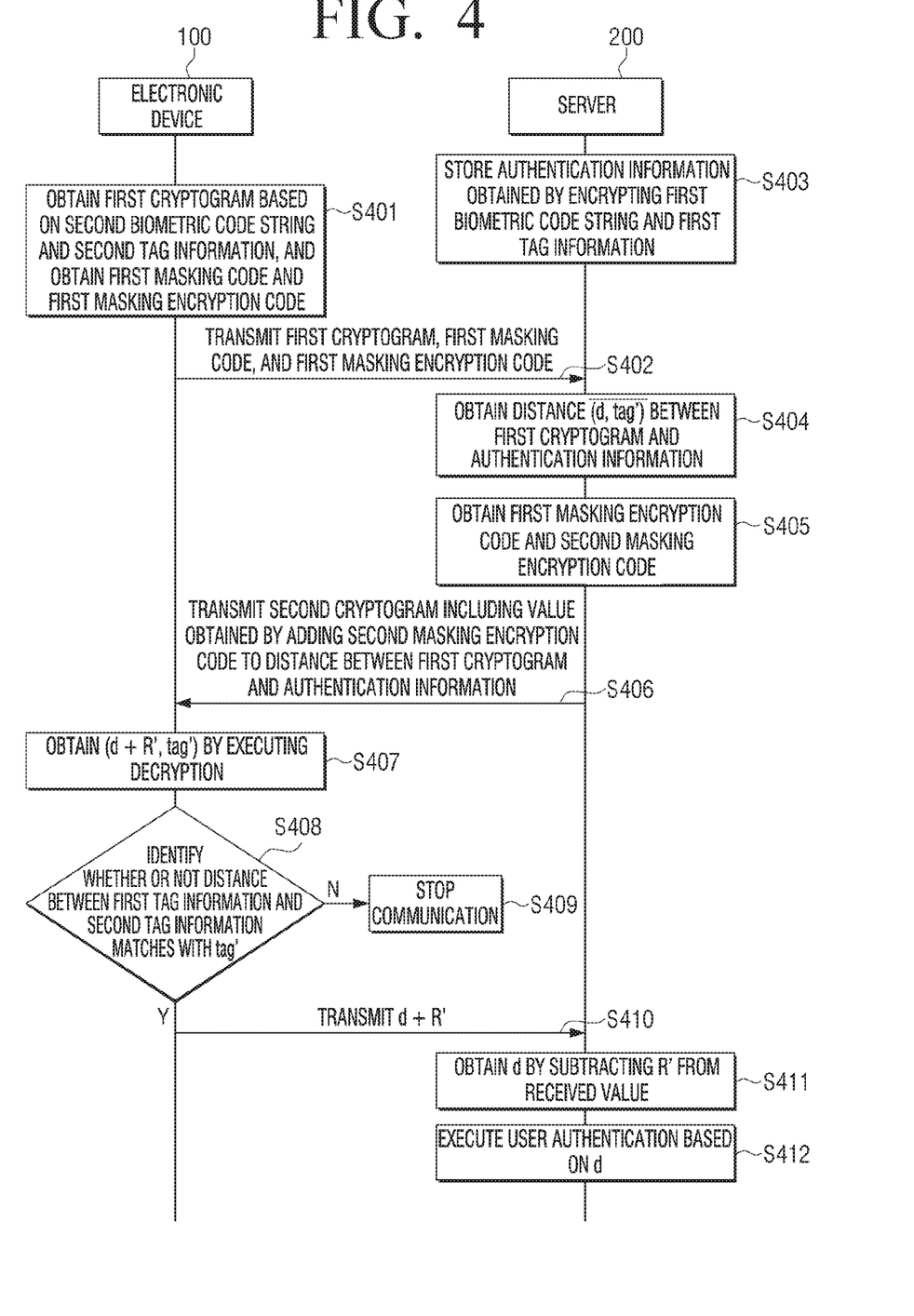
FIG. 4 is a flowchart for explaining the electronic system according to an embodiment.

FIG. 4 is a flowchart for explaining the electronic system according to an embodiment of the disclosure.

The electronic device 100 according to an embodiment of the disclosure may obtain the second biometric code string from the biometric data and obtain the first cryptogram based on the second tag information stored in advance. In addition, the electronic device 100 may obtain the first masking code and the first masking encryption code based on the first masking code (S401).

Then, the electronic device 100 may transmit the first cryptogram, the first masking code, and the first masking encryption code to the server (S402).

The server 200 may store the authentication information obtained by encrypting the first biometric code string and the first tag information (S403).

In this case, the authentication information may be formed of the same type of cryptogram as the first cryptogram described above. In an example, both the first cryptogram and the authentication information may be implemented as the homomorphic cryptogram by the CRT method.

In addition, the server 200 may receive and store the authentication information from the electronic device 100, before receiving the first cryptogram (not shown).

Then, the server 200 may obtain the distance $$\overline{(d, tag')} = \sum_{i=0}^{n} (\overline{x}_i^* - \overline{x}_i)^2$$

between the first cryptogram and the authentication information (S404). Specifically, the server 200 may obtain $$\overline{(d, tag')} = \sum_{i=0}^{n} (\overline{x}_i^* - \overline{x}_i)^2$$

with the distance calculation as in Mathematical Expression 4 described above.

The server 200 may obtain the second masking encryption code $\Sigma_{j=0}^{N-1} \alpha_j \overline{(R_j, 0)}$ by multiplying the arbitrary integer string α by the first masking encryption code $\overline{(R_j, 0)}$.

In addition, the server 200 may obtain the second masking code α(R, 0) by multiplying the arbitrary integer string α by the first masking code (R,0) (not shown).

The server 200 may store the obtained second masking code in the storage 210. This is for obtaining d in subsequent Step S411.

Then, the server 200 may transmit the second cryptogram including the value obtained by adding the second masking encryption code $\Sigma_{j=0}^{N-1} \alpha_j \overline{(R_j, 0)}$ to the distance $$\overline{(d, tag')} = \sum_{i=0}^{n} (\overline{x}_i^* - \overline{x}_i)^2$$

between the first cryptogram and the authentication information to the electronic device 100 (S406). In this case, the second cryptogram may be expressed as $\overline{(d,tag')}+\Sigma_{j=0}^{N-1}\alpha_j \overline{(R_j, 0)}$.

The electronic device 100 may decrypt the received second cryptogram and obtain (d+R', tag') (S408). In this case, R' means $\Sigma_{j=0}^{N-1}\alpha_j R_j$.

Then, the electronic device 100 may identify whether or not the distance between the first tag information and the second tag information matches with tag' (S408). Specifically, since both the first tag information and the second tag information are values generated by the electronic device 100, the electronic device 100 may execute the calculation of the distance between the first tag information and the second tag information.

In this case, if the distance between the first tag information and the second tag information does not match with tag', the communication with the server 200 may be stopped (S409).

Specifically, if tag' received by the electronic device 100 is not a value based on the first tag information and the second tag information identified by the electronic device 100 itself, the electronic device 100 may identify the cryptogram as the cryptogram transmitted by a malicious server and stop the communication.

If the distance between the first tag information and the second tag information matches with tag', the electronic device 100 may transmit d+R' (S410).

Specifically, if tag'=$\Sigma_{i=0}^{N-1}$(tag$^*_i$–tag$_i$)$^2$ is satisfied, the electronic device 100 may transmit d+R'. In this case, tag* represents the first tag information and tag represents the second tag information.

Then, the server 200 may obtain only d by subtracting R' from the received d+R' (S411) and execute the user authentication based on d (S412).

Specifically, the value d corresponds to the distance value between the first biometric code string and the second biometric code string and thus, the user authentication may be executed according to d. In an example, if d corresponds to the distance value lower than the predetermined threshold value, the server 200 may execute the user authentication by determining that a difference is not great between the first biometric code string stored in advance and the second biometric code string received from the electronic device 100.

Figure 5:
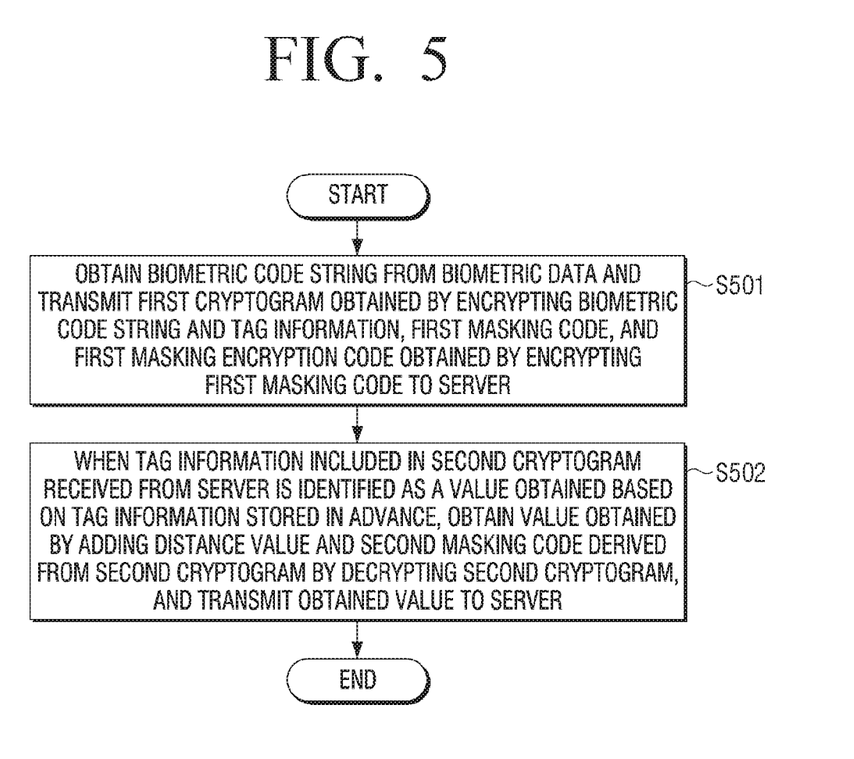
FIG. 5 is a flowchart for explaining a method for controlling the electronic device according to an embodiment.

FIG. 5 is a flowchart for explaining a method for controlling the electronic device according to an embodiment of the disclosure.

The electronic device 100 according to an embodiment of the disclosure may obtain the biometric code string from the biometric data, and transmit the first cryptogram obtained by encrypting the biometric code string and the tag information, the first masking code, and the first masking encryption code obtained by encrypting the first masking code to server 200 (S501).

Then, when the tag information included in the second cryptogram received from the server is identified as a value obtained based on the tag information stored in advance, the electronic device 100 may obtain a value obtained by adding the distance value to the second masking code derived from the second cryptogram by decrypting the second cryptogram, and transmit the obtained value to server 200 (S502).

In this case, the distance value includes a distance value between the biometric code string and the biometric code string stored in the server 200 in advance, and the second masking code includes a code obtained by the server 200 based on the first masking code.

The second cryptogram includes a cryptogram obtained by the server 200 based on the first cryptogram and the second masking encryption code, and the second masking encryption code includes a code obtained by the server 200 based on the first masking encryption code.

The specific operation regarding the electronic device 100 will be omitted since it has been described in FIGS. 2 to 4.

Figure 6:
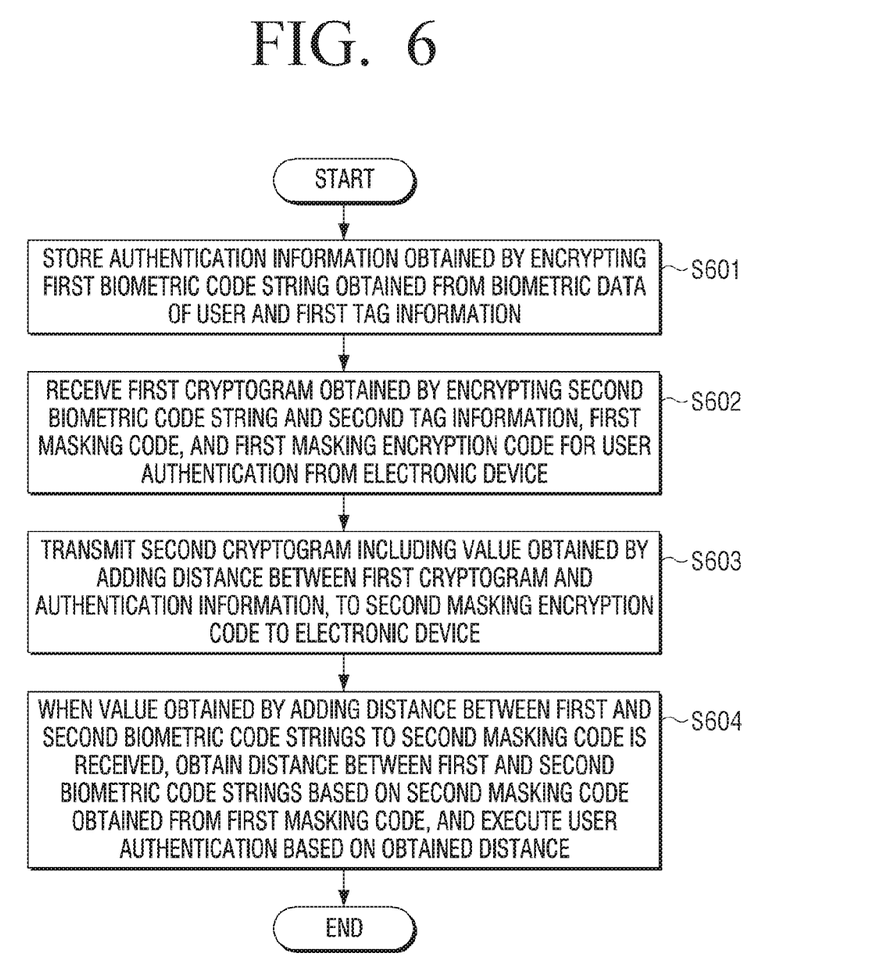
FIG. 6 is a flowchart for explaining a method for controlling the server according to an embodiment.

FIG. 6 is a flowchart for explaining a method for controlling the server according to an embodiment of the disclosure.

The server 200 according to an embodiment of the disclosure may store the authentication information obtained by encrypting the first biometric code string obtained from the biometric data of a user and the first tag information (S601). In this case, the authentication information includes a value stored by receiving from the electronic device 100.

Then, the server 200 may receive the first cryptogram obtained by encrypting the second biometric code string and the second tag information, the first masking code, and the first masking encryption code for the user authentication from the electronic device 100 (S602).

The server 200 may transmit the second cryptogram including a value obtained by adding the distance between the first cryptogram and the authentication information, to the second masking encryption code, based on the received value and the authentication information to electronic device 100 (S603).

Then, when the value obtained by adding the distance between the first and second biometric code strings to the second masking code is received from the electronic device 100, the server 200 may obtain the distance between the first and second biometric code strings based on the second masking code obtained from the first masking code, and execute the user authentication based on the obtained distance (S604).

In this case, the server 200 may obtain the second masking encryption code based on the first masking encryption code.

The specific operation regarding the server 200 will be omitted since it has been described in FIGS. 2 to 4.

At least some configurations of the methods according to embodiments of the disclosure described above may be implemented in a form of an application installable in the existing electronic device.

In addition, at least some configurations of the methods according to embodiments of the disclosure described above may be implemented simply by the software update or hardware update in the existing electronic device 100.

Further, at least some configurations in embodiments of the disclosure described above may be executed through an embedded server prepared in the electronic device 100.

At least some configurations of the embodiments described above may be implemented in a recording medium readable by a computer or a similar device using software, hardware, or a combination thereof. In some cases, at least some configurations of the embodiments described in this specification may be implemented as a processor itself. According to the implementation in terms of software, at least some configurations of the embodiments such as procedures and functions described in this specification may be implemented as separate software modules. Each of the software modules may execute one or more functions and operations described in this specification.

Computer instructions for executing processing operations of the electronic device 100 according to the embodiments of the disclosure descried above may be stored in a non-transitory computer-readable medium. When the computer instructions stored in such a non-transitory computer-readable medium are executed by the processor of a specific machine, the computer instructions may enable the specific machine to execute the processing operations of the electronic device 100 according to the embodiments described above.

The non-transitory computer-readable medium is not a medium storing data for a short period of time such as a register, a cache, or a memory, but means a medium that semi-permanently stores data and is readable by a machine. Specific examples of the non-transitory computer-readable medium may include a CD, a DVD, a hard disk, a Blu-ray disc, a USB, a memory card, and a ROM.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. An electronic device comprising:
    storage configured to store tag information, the tag information comprising first tag information for communication to a server for user registration and second tag information for communication to the server for user authentication;
    a communicator comprising a communication circuit;
    a sensor; and
    at least one processor configured to:
        obtain a first biometric code string from biometric data sensed by the sensor,
        obtain a first cryptogram by encrypting the first biometric code string and the second tag information,
        transmit the first cryptogram, a first masking code, and a first masking encryption code obtained by encrypting the first masking code to the server via the communicator,
        receive a second cryptogram including third tag information, via the communicator,
        decrypt the second cryptogram,
        identify whether the third tag information corresponds to a first distance value corresponding to a difference between the first tag information and the second tag information,
        based on identifying that the third tag information corresponds to the first distance value between the first tag information and the second tag information,
        obtain a value for authentication by adding a second distance value to a second masking code, and
        transmit the obtained authentication value to the server via the communicator for user authentication,
    wherein the second distance value is a distance value between the first biometric code string and a second biometric code string stored in the server in advance, and
    wherein the second masking code is a code obtained by the server based on the first masking code.

2. The electronic device according to claim 1, wherein at least one processor is configured to, based on a mode for registering biometric data of a user being executed, obtain the second biometric code string from biometric data sensed by the sensor, and transmit a third cryptogram obtained by encrypting the second biometric code string and the first tag information to the server via the communicator.

3. The electronic device according to claim 1, wherein the storage stores a private key,
    wherein the first cryptogram is encrypted by the private key, and
    wherein the second cryptogram is obtained by executing distance calculation with respect to the first cryptogram in an encrypted state.

4. The electronic device according to claim 1, wherein biometric data sensed by the sensor comprises at least one of fingerprint data, voice data, face data, iris data, data of lines on palm, or vein distribution data.

5. A method for controlling an electronic device which stores tag information comprising first tag information for communication to a server for user registration and second tag information for communication to the server for user authentication, the method comprising:
    obtaining a first biometric code string from biometric data sensed by a sensor of the electronic device;
    obtaining a first cryptogram by encrypting the first biometric code string and the second tag information;
    transmitting the first cryptogram, a first masking code, and a first masking encryption code obtained by encrypting the first masking code to the server via a communication circuit of the electronic device;
    receiving a second cryptogram including third tag information,
    decrypting the second cryptogram,
    identifying whether the third tag information corresponds to a first distance value corresponding to a difference between the first tag information and the second tag information,
    based on identifying the third tag information corresponds to the first distance value between the first tag information and the second tag information,
    obtaining a value for authentication by adding a second distance value to a second masking code, and
    transmitting the obtained authentication value to the server via the communication circuit for user authentication,
    wherein the second distance value is a distance value between the first biometric code string and a second biometric code string stored in the server in advance, and
    wherein the second masking code is a code obtained by the server based on the first masking code.

6. The method according to claim 5, further comprising:
    based on a mode for registering biometric data of a user being executed, obtaining the second biometric code string from sensed biometric data, and transmitting a third cryptogram obtained by encrypting the second biometric code string and the first tag information to the server.

7. The method according to claim 5, wherein the first cryptogram is encrypted by a private key, and
    wherein the second cryptogram is obtained by executing distance calculation with respect to the first cryptogram in an encrypted state.

8. The method according to claim 5, wherein biometric data sensed by the sensor comprises at least one of fingerprint data, voice data, face data, iris data, data of lines on palm, or vein distribution data.

* * * * *